Patented Apr. 17, 1934

1,955,021

UNITED STATES PATENT OFFICE 1,955,021

METHOD OF PURIFYING RICINOLEIC ACID

Theodore H. Rider, Cincinnati, Ohio, assignor to The Wm. S. Merrell Company, Cincinnati, Ohio, a corporation of Ohio No Drawing. Application February 11, 1932, Serial No. 592,443

2 Claims. (Cl. 260—122)

The present invention relates to a method of purifying ricinoleic acid and has for its object the provision of a series of steps whereby to completely remove certain fatty acids which are frequently present in varying amounts after purification by other methods.

Another object is to provide a method of purifying ricinoleic acid whereby the resultant product is rendered clearer, colorless, and of greater activity in its detoxifying properties.

Another object is to provide a method whereby the keeping qualities of ricinoleic acid are enhanced.

Ricinoleic acid purified by the method hereinafter described may be adapted to any of its known uses and is especially adapted for use in compounds of therapeutic and detoxifying character.

The fatty acids of castor oil consist mainly of the unsaturated ricinoleic acid, together with smaller amounts of at least four other acids. Two unsaturated fatty acids, oleic and linolic and two saturated fatty acids, stearic and dihydroxy-stearic are present. This invention covers a purification of ricinoleic acid from castor oil in which the saturated fatty acids are first removed and the resulting purified ricinoleic acid used as such or subjected to a further purification in which the ricinoleic acid is separated from the other unsaturated fatty acids.

Other methods for the removal of the saturated acids are either cumbersome or ineffective. The present method is both simple and effective. It is as follows:

The free fatty acids are obtained in known manner from castor oil (for example by saponification with concentrated aqueous potash and subsequent liberation of the free fatty acids by the addition of an excess of dilute hydrochloric acid). The free fatty acids are dissolved in an equal volume of alcohol (methyl, ethyl, propyl, butyl, isobutyl or a suitable member of this series) and chilled (preferably to —15° C.). The solution is held at such low temperature until the precipitation of the insoluble solid fatty acids is complete and is then filtered. The alcohol may then be removed by distillation or by washing the solution with a large volume of water. The free fatty acids so obtained contain a varying amount of esters formed by a reaction between the fatty acids and the alcohol. In order to avoid leaving this ester mixed with the free fatty acids, the free fatty acids are neutralized with an alkali and the resulting solution heated in the presence of an excess of alkali in order to saponify any esters present. By adding an excess of dilute mineral acid the partially purified free fatty acids are liberated and may be used for the preparation of any derivative desired (such as sodium ricinoleate). If such a derivative as sodium ricinoleate is prepared by simple neutralization of the free fatty acids as recovered from the alcoholic solution, the esters as mentioned above constitute an undesirable impurity. An aqueous solution of such material will in many cases separate a film of the esters.

Ricinoleic acid purified to this extent is free from saturated (solid) fatty acids and may be used as such for the preparation of any derivative thereof, such derivative being superior to previously obtained purified products by reason of the more complete removal of the saturated (solid) acids.

In order to separate the ricinoleic acid from the other unsaturated acids, the partially purified acids as described are so treated as to render distillation possible. The partially purified free fatty acids are first esterified with an alcohol (methyl, ethyl, propyl, butyl, isobutyl or a suitable member of this series) in known manner (as by the heating of a solution of the free fatty acids in a solution of the desired absolute alcohol in the presence of hydrogen chloride as a catalyst). The excess alcohol is removed by distillation or washing with water and the esters are distilled in vacuo. (The methyl esters distill at approximately 188°–193° C. under a pressure of 4 mm.)

In practice, the removal of the solid acids and this esterification are made a continuous process as follows: The free fatty acids are dissolved in the desired absolute alcohol, chilled and filtered as described, thus removing the solid acids. This solution is then suitable as the esterification reaction mixture without isolating the partially purified free fatty acids. A catalyst, such as hydrogen chloride, may be added, esterification produced by heating and the esters isolated as above described.

The esters at this stage will be the methyl, ethyl, propyl, butyl, isobutyl or other esters depending upon whether methyl, ethyl, propyl, butyl, isobutyl or other similar alcohol has been used. The following steps will be described on the basis of having prepared the methyl ester, although it is to be understood that any one of these other esters are similarly prepared and used in subsequent steps according to the same principles with similar results.

It is not feasible to separate methyl ricinoleate from the other methyl esters by fractional distillation, since there is no distinct fractionation during this process. The invention to facilitate this separation is as follows: The combined methyl esters are treated with an acid chloride or acid anhydride of a water soluble organic acid (such as acetic acid) thereby esterifying the alcoholic hydroxyl group in the methyl ricinoleate and thus preparing a derivative of higher boiling point than methyl ricinoleate without affecting the other non-hydroxylated methyl esters. Thus impure methyl ricinoleate may be heated with twice its weight of acetic anhydride until the reaction is completed. The excess acetic anhydride and by-product acetic acid may be removed by distillation or the acetic anhydride may be converted to acetic acid by heating the mixture with water. Then all of the acetic acid is removed by washing with water. The resulting product contains methyl acetyl recinoleate and the unaltered methyl esters of non-hydroxylated fatty acids. This ricinoleate (such as methyl acetyl ricinoleate) can then be satisfactorily separated from the other methyl esters by vacuum distillation. Pure methyl acetyl ricinoleate distils at approximately 195° C. under a pressure of 1–2 mm. The distillate is divided into fractions and those fractions selected having the theoretically correct iodine number and, in the case of methyl acetyl ricinoleate, yielding the theoretically correct amount of acetic acid upon saponification, acidification and distillation in known manner.

These fractions are pure derivatives of ricinoleic acid and contain no other fatty acid derivatives. Such a fraction is saponified with an alkali solution and the fatty acids liberated by the addition of an excess of mineral acid. The acetic or other water soluble organic acid present is then removed by washing with water, yielding pure ricinoleic acid which may then be dried in a known manner (as by heating).

This pure ricinoleic acid which is free from contaminating fatty acids may be used in the preparation of any ricinoleic acid derivative. Pure sodium ricinoleate may be prepared by neutralizing this pure ricinoleic acid with a solution of the stochiometric amount of c. p. sodium hydroxide and drying the resulting soap.

In connection with the disclosure herein reference is also made to my copending divisional application Serial No. 697,079, filed November 7, 1933, wherein is claimed the purification procedure involving esterification of the partially purified free fatty acids after separating the solid fatty acids.

What is claimed is:

1. The method of purifying ricinoleic acid comprising the steps of dissolving a quantity of free fatty acids obtained from castor oil in an equal volume of alcohol, then chilling the mixture to completely precipitate the insoluble solid fatty acids, then filtering out said solid fatty acids, then removing the alcohol to recover free fatty acids containing variable amounts of esters produced in the alcohol solution, then freeing the fatty acids from these esters, by neutralizing the free fatty acids with alkali and heating the resulting solution in the presence of an excess of alkali to saponify any esters present and finally liberating the free partially purified ricinoleic acid by the addition of an excess of dilute mineral acid.

2. The method of purifying ricinoleic acid which comprises the steps of dissolving free fatty acids obtained from castor oil in a quantity of alcohol sufficient to render it easily filtered and precipitated, then chilling the mixture to precipitate the solid fatty acids, filtering out said solid fatty acids, treating the residue with an excess of alkali and heat to obtain a soap which is free of fatty acids and esters.

THEODORE H. RIDER.